United States Patent [19]

Rinaldi et al.

[11] Patent Number: 4,471,080

[45] Date of Patent: Sep. 11, 1984

[54] PROCESS FOR MAKING SELF-EXTINGUISHING, BY MEANS OF RED PHOSPHORUS, SYNTHETIC THERMOPLASTIC MATERIALS AND PRODUCTS SO OBTAINED

[75] Inventors: Gianfranco Rinaldi; Giuseppe Megler, both of Pontenuovo di Magenta, Italy

[73] Assignee: Saffa S.p.A., Milan, Italy

[21] Appl. No.: 464,572

[22] Filed: Feb. 7, 1983

[30] Foreign Application Priority Data

Feb. 9, 1982 [IT] Italy .............................. 19515 A/82

[51] Int. Cl.$^3$ .......................... C08J 3/20; C08K 9/00; C08K 9/10; C08K 3/32
[52] U.S. Cl. .................................. 523/205; 523/210; 523/351; 524/80; 524/414; 524/706
[58] Field of Search ....................... 523/205, 210, 351; 524/414, 504, 566, 586, 602, 706, 80

[56] References Cited

U.S. PATENT DOCUMENTS

| | | | |
|---|---|---|---|
| 3,806,488 | 4/1974 | Stone et al. ........................ | 524/239 |
| 4,208,317 | 6/1980 | Cerny et al. ....................... | 523/205 |

FOREIGN PATENT DOCUMENTS

| | | | |
|---|---|---|---|
| 649800 | 10/1962 | Canada .............................. | 523/351 |
| 0052217 | 5/1982 | European Pat. Off. ............ | 523/210 |
| 2655739 | 12/1976 | Fed. Rep. of Germany . | |

*Primary Examiner*—John Kight, III
*Assistant Examiner*—Kriellion Morgan
*Attorney, Agent, or Firm*—Karl F. Ross; Herbert Dubno

[57] ABSTRACT

A process for making self-extinguishing thermoplastic materials based on synthetic polymeric substances by incorporation of red phosphorus into said materials, which comprises the following steps:

forming a "concentrate" consisting of 30–70% of a "mother polymeric substance" and of 70–30% of red phosphorus powder previously encapsulated in a modified cationized melamine resin;

incorporating said concentrate into a thermoplastic material to be made self-extinguishing and consisting of at least 50% of a polymeric substance similar to or consistent with the substance comprised in said concentrate, the amount of the above-mentioned concentrate being quantitatively so proportioned that the final self-extinguishing thermoplastic material contains 1–15% by weight of encapsulated red phosphorus.

6 Claims, No Drawings

PROCESS FOR MAKING SELF-EXTINGUISHING, BY MEANS OF RED PHOSPHORUS, SYNTHETIC THERMOPLASTIC MATERIALS AND PRODUCTS SO OBTAINED

FIELD OF THE INVENTION

This invention relates to a process for making self-extinguishing thermoplastic materials based on synthetic polymeric substances—such as for example polyamides, polyolefins, polycarbonates, polystyrene, copolymers of styrene with acrylonitrile and/or butadiene—by addition of red phosphorus thereto.

BACKGROUND OF THE INVENTION

It is known that red phosphorus is an excellent flame-retardant for many types of polymeric substances.

It is known too that, in order that the flame-retarding effect of red phosphorus may have—as is desired—a high efficiency, it is necessary that red phosphorus should be added by distributing it in the mass of said polymeric substances in a homogeneously, finely particulated form. This cannot be accomplished without technical difficulties according to the usual methods which, besides, having some drawback connected with the safety and environmental hygiene in relation to the necessity of handling fine red phosphorus powders which, as is known, are toxic (formation of phosphine by reaction with hydrogen-containing substances, in particular water) and create combustion hazards.

SUMMARY OF THE INVENTION

An object of the present invention is therefore to provide a process which permits fine and homogeneous dispersion, by means of a reliable and safe technique, of red phosphorus into synthetic thermoplastic materials.

This and still other objects, while will be better apparent to a technician skilled in the art from the detailed description given hereinafter, are achieved, according to the present invention, by a process comprising the following steps:
  (a) forming a "concentrate" comprising 30–70% of a polymeric substance ("mother polymeric substance") and 70–30% of red phosphorus powder, having particle sizes below 100 microns and previously encapsulated in a modified cationized melamine resin;
  (b) incorporating said concentrate into a thermoplastic material, to be made self-extinguishing, consisting of at least 50% of a polymeric substance similar to or compatible with the "mother polymeric substance" contained in the concentrate, the amount of said concentrate being quantitatively proportioned in such a manner that the final self-extinguishing thermoplastic material contains 1–15% by weight of said encapsulated red phosphorus powder.

DETAILED DESCRIPTION OF THE INVENTION

The abovesaid encapsulated red phosphorus powder is formulated and obtained, according to the present invention, according to the process described in European Patent Application No. 81107981.3, Publication No. 0 052 217 A1 (Priority: Italian Patent Application No. 26064 A/80) in the name of the same Applicant. According to the afore-cited Application, said encapsulated red phosphorus powder is prepared by a process substantially consisting of coating the particles of a red P powder (in an aqueous dispersion) with a melamine resin, by precipitation thereof from a cationized precondensate (dissolved in the same dispersion) obtained from melamine (25.27–21.62% by weight), formaldehyde (36.04–30.85% by weight), triethanolamine (29.87–25.57% by weight) and a monohydroxyl aliphatic alcohol containing a number of carbon atoms lower than 5, preferably methanol (8.82–21.96% by weight). Said red phosphorus powder so encapsulated (hereinafter referred to also as encapsulated r/P) possesses—in accordance with the purposes of the encapsulation—high characteristics of stability to the generation of phosphine, even under very severe conditions of use.

More particularly, the method for preparing said encapsulated red phosphorus comprises the following steps:

(a) preparing the melamine condensate: in a first step, methanol, triethanolamine, formaldehyde (the last substance in an aqueous solution at approximate 45% calculated on dry basis) are reacted for about 2 hours at approx. 85° C. in percent ratios, referred to the dry substance, respectively of 8.82%, 29.87% and 36.04%, the remaining 25.27% being the melamine which is to be added in a second step, at the end of the aforesaid reaction, in order to cause the melamine condensate to form by heating the aforesaid composition at about 90° C. for approx. 6 hours (—the starting pH value of 9.5–9.8 being adjusted to the value of 7.5–7.8—) till a viscosity of 420–470 centipoises at 20° C. is attained, whereupon, after having adjusted the pH to a value of 7–7.6, it is diluted with water, so obtaining a solution at about 38% of dry substance and with a viscosity of 40–50 centipoises at 20° C. pH adjustments are effected by means of a mineral acid in an aqueous solution, at 18% thus cationizing the melamine condensate.

(b) encapsulating red phosphorus powder: a hydrodispersion of micronized red phosphorus powder having a density of 1.38–1.58 is additioned with a desired amount of the aqueous solution at 38% of cationized melamine condensate, prepared as per point (a); the so obtained phosphorus dispersion in the melaine condensate solution is heated, under stirring, for about 1 hour at approx. 100° C., keeping substantially unaltered-by means of a condenser—the reaction mixture volume: under such conditions the melamine condensate precipitates slowly and uniformly (evolving formaldehyde) in the form of a resin partially cross-linked, at first in the liquid-viscous, then in the solid state, around the red phosphorus particles, so encapsulating them. Cross-linking is then completed during dehydration by drying of the product, preferably in a thin layer, at about 100° C. and in an inert gas flow or preferably under vacuum, till formaldehyde does no longer evolve. At the end a red phosphorus powder is obtained, which is free-flowing, stabilized to phosphine forming and easily dispersible in to the polymeric materials (for example by means of processes based on plastic mass melting).

In relation to its excellent properties of chemical stability, said encapsulated r/P powder can be incorporated without drawbacks in great amounts (even of the order of 50–70% by weight) into polymeric substances for providing "concentrates" intended for the successive addition of said encapsulated r/P to thermoplastic materials to be made self-extinguishing. Such a thermoplastic material is a polymeric substance identical with or similar to or consistent with the "mother polymeric substance" contained in said concentrate.

The abovesaid concentrate is prepared in a safe and drawback-free way, according to a preferred but not exclusive embodiment of the present invention, by first forming a solid mixture—in, the desired ratios and by means of a conventional apparatus—consisting of said previously encapsulated red phosphorus powder and of a "mother polymeric substance" in the form of powder, granules and the like (and optionally also of additives known in the art, such as dyestuffs, stabilizers, lubricants and the like), and by successively bringing the resulting mixture to the plastic state by feeding said mixture (under an inert atmosphere) into an extruder, preferably a two-screw extruder (equipped with an electric heating, a vent system and a granulating head) known to those skilled in the art, wherefrom solidified granules come out, which exhibit a preferably cylindrical shape (having dimensions of for example 3×3 mm, and consisting for instance of 50% of encapsulated r/P and of 50% of "mother polymeric substance") and are ready for being utilized—whenever and whereever desired, in an easy, realiable and safe manner (in particular:absence of harmful gas exhalations, absence of mold corrosion)—as vehicles for an optimum incorporation and dispersion of said encapsulated r/P powder into the thermoplastic material to be made self-extinguishing, which substantially consists of a polymeric substance identical with (or similar to or consistent with) the one contained in said concentrate granules, and optionally of coadjuvant substances known in the art, such as reinforcing agents, fillers, pigments, lubricants, stabilizers and the like.

Said incorporation is easily accomplished by means of usual apparatuses and processes known in the plastic material processing technology, for example by continuously co-feeding, in the desired ratios, to a two-screw extruder, the abovesaid concentrate granules and the thermoplastic material to be made self-extinguishing (in the form of powder, granules or the like), optionally concurrently with one or more of the abovesaid additives, such as, e.g.—in particular—glass fibres, calcium carbonate, talc, titanium dioxide.

When leaving said extruder, the thermoplastic self-extinguishing material (homogenized in the hot area of said extruder) is solidified in the desired form (by equipping said extruder, case by case, with a suitable head and a proper cooling system, both known in the art), for example in the form of granules and the like, or also in the form of semifinished or finished products, for instance pipes and profiled elements.

Said granules or the like, semifinished and finished products have incorporated in their mass the abovementioned encapsulated powder of r/P in a finely particulated and uniformly distributed manner, what results in an excellent flame-retarding action exerted by the red phosphorus.

The process illustrated hereinabove is employed very advantageously for making self-extinguishing the polyamides, in particular the polyamides obtained by polycondensation of diamines with dibasic organic acids (such as for example the "polyamide-6,6") and the polyamides obtained by polymerization of lactams (for example ε-caprolactam), the structures of both abovesaid types of polyamides being characterized by bonds such as —NH—CO—.

The process forming the object of the present invention is advantageously applied for making self-extinguishing also many other thermoplastic materials, such as e.g.:

homopolymers and copolymers of monomers having an olefinic unsaturation, such as polyethylene, polypropylene, ethylene/propylene copolymers, polystyrene, styrene/acrylonitrile copolymers and ABS copolymers (acrylonitrile/butadiene/styrene), vinyl chloride homo- and co-polymers, vinyl acetate copolymers;

polycarbonates, in particular polycarbonates derived from bisphenol A and phosgene;

polyacrylates, in particular polymethylmethacrylate;

linear polyesters, such as polyethyleneterephthalate and polybutylene-terephthalate.

With a view to better illustrating the process forming the object of the present invention, there are given hereinafter some examples of embodiments thereof, which are intended for merely illustrating but not limiting the invention.

In the following examples, the amounts are expressed by weight. The values of specific gravity (s.g.) and of softening point (s.p.) are determined according to ASTM-D 792 and ASTM-D 1525, respectively, while the self-extinguishing property of the thermoplastic materials is checked by vertical flame method UL-94 utilizing injection press-molded test pieces having the following dimensions: 152.4×17.7×1.6 mm.

(a) Preparing encapsulated red phosphorus: 640 g of an aqueous solution containing 45% of formaldehyde, (9.6 moles) 70.5 g 2.2 of methanol, 238.78 g (1.6 moles) of triethanolamine were introduced into a conventional reactor, known in the art, equipped with electrical heating, a reflux condenser with a vacuum intake and a majestic stirrer, after having started both stirrer and condenser. The mixture so obtained, having a pH=9.8, was brought to 85° C. and maintained at such temperature for 2 hours. After cooling to 50° C., 201.8 g (1.6 moles) of melamine were added (the mixture now consisted of 36.04% of formaldehyde, 8.82% of methanol, 29.87% of triethanolamine and 25.27% of malamine). The pH was adjusted to a value of 7.6 by addition of 48 ml of hydrochloric acid at 18% in an aqueous solution, and the mixture temperature was raised to 90° C. and kept at such for 6 hours, so obtaining a melamine condensate solution having a viscosity of 450 centipoises at 20° C. At the end of this heating period said condensate solution was stabilized by addition of 390 l of water and by adjusting the pH to a value of 7.5 by adding 80 l hydrochloric acid at 18% in an aqueous solution, finally obtaining a solution of cationized melamine condensate at 38.3% of dry substance having a viscosity of 40 centipoises at 20° C. The above-cited pH adjustments represent the cationizing steps of the melamine condensate.

27.6 l of the above-obtained solution of cationized melamine condensate were drawn and introduced into a reactor (equipped with a mechanical stirrer, a condenser and a heating jacket) along with 300 g of red phosphorus powder, having a particle size below 10 microns, in the form of an aqueous dispersion having a density of 1.38. At the conclusion of this operation the components were homogenized by stirring, this obtaining a red phosphorus powder suspension in a cationized melamine solution condensate, which was heated at 100° C. for 1 hour. During such heating time the condensate got insoluble (with formaldehyde evolution and slowly and uniformly precipitated, in the form of a partially cross-linked melamine resin, at first in the liquid-viscous state then turning into the solid state, onto the particles surfaces of the red phosphorus powder, which were thus encapsulated by a very adherent, continuous and compact layer of said resin; finally, a water dispersion of red phosphorus encapsulated by melamine resin, having a slurry-like consistency was obtained. Said dispersion was spread to form a thin layer of 2–3 mm thickness in a tray and was put into an oven at 90° C. under vacuum, at a residual pressure of approx. 30 mm Hg, till formaldehyde evolution was no longer observed. During such drying, both dehydration of said dispersion and completion of melamine resin cross-linking occurred, and at the end a friable layer, easily convertible into a free-flowing product, of red phosphorus in powder encapsulated with 4% of melamine resin was obtained; such powder proved to be stable to phosphine forming and was easily dispersible into the polymeric materials.

EXAMPLE 1

Into a two-screw extruder with a granulating head, known in the art, equipped with an electric heating and vent system, there were continuously, simultaneously fed by means of two screws in a $CO_2$ atmosphere, polyamide-6,6 (s.p.=205° C.) in 3×3 mm cylindrical granules and encapsulated r/P powder having a particle sizes below 40μ in the following ratio:

Polyamide-6,6: 40 parts
encapsulated r/P: 60 parts.

About 500 kg of concentrate were produced in the aggregate without any drawback either of technical or of hygienic-environmental nature (substantial absence of phosphine in the place of work).

The concentrate so obtained was for the most part packaged and stored for future uses, and in part utilized for preparing a "self-extinguishing polyamide", what was accomplished by co-feeding and homogenizing, in a plastic state, in a two-screw extruder similar to the one mentioned hereinbefore, 20 kg of concentrate and 80 kg of polyamide-6,6 (s.p.=226° C.). 3×3 mm cylindrical granules of "self-extinguishing polyamide-6,6" containing about 12% of encapsulated r/P were obtained.

From said granules there were molded (by means of an injection press) test pieces of 152.4 mm length, 12.7 mm width and 1.6 mm thickness, wherein it was possible to observe—under an optical microscope—that the particles of encapsulated red phosphorus powder were homogeneously distributed in all the polyamide mass, in compliance with the objects of the present invention.

Said test pieces proved to be self-extinguishing.

EXAMPLE 2

Using the same concentrate of Example 1 (Polyamide-6,6 at 60% of encapsulated r/P) there were prepared 100 kg of "self-extinguishing reinforced polyamide-6,6" by kneading in the plastic state, in the same extruder as in said example, the following components in the amounts indicated by side thereof:

Concentrate (Polyamide-6,6 at 60% of encapsulated r/P): 15 parts
Polyamide-6,6 (s.p.=226° C.): 60 parts
"Reinforcing" glass fibres (about 600μ long): 25 parts There were obtained granules of "self-extinguishing reinforced polyamide-6,6" containing about 9% of encapsulated r/P, in the form of 3×3 mm cylindrical granules, from which test pieces having the same dimensions as those of Example 1 were obtained, and which, like those of Example 1, contained, incorporated therein, the particles of encapsulated r/P powder homogeneously distributed in all their mass and which proved to be self-extinguishing.

EXAMPLE 3

The same procedure was followed as in Example 1, with the exception that the process was carried out with a polyolefin instead of with polyamide.

High-density polyethylene (s.g.=0.93) in the form of 3×3 mm cylindrical granules was employed, forming first a "mother polyethylene" concentrate containing 60% of encapsulated r/P and successively producing—by mixing 86 parts of polyethylene with 14 parts of said concentrate—"self-extinguishing polyethylene" granules (3×3 mm cylinders) at about 8% of red phosphorus, which, once transformed into test pieces like in Example 1 and observed under an optical microscope, revealed a homogeneous distribution in their whole mass of the particles of encapsulated r/P powder, and proved to be self-extinguishing.

EXAMPLE 4

By means of a vertical mixer there were prepared—under a $CO_2$ atmosphere—100 kg of a mixture, in a ratio 60:40, of encapsulated r/P and styrene-acrylonitrile copolymer (SAN) at 25% of acrylonitrile. Said copolymer (s.p.=93° C.) was of the type obtained by the polymerization-in-suspension process, and therefore in the form of powder (beads). The mixture obtained hereinabove was brought to the plastic state and transformed into 3×3 mm cylindrical granules by means of the two-screw extruder of Example 1, thus obtaining a concentrate at 60% of encapsulated r/P in SAN (r/P-SAN concentrate). Most of such concentrate was packaged and stored for future uses, while a part thereof was utilized to prepare acrylonitrile-butadiene-styrene copolymers (known as ABS) of the self-extinguishing type, as follows:

in a conventional horizontal mixer there was prepared a mixture composed as follows:
r/P-SAN concentrate: 15 parts
SAN: 35 parts
Styrene-acrylonitrile copolymer grafted on polybutadiene (at 30%) of polybutadiene): 50 parts Said mixture was then homogenized to the plastic state, in an extruder like the one illustrated hereinabove, and transformed into 3×3 mm cylindrical granules of self-extinguishing ABS at about 9% of r/P. Test pieces of said ABS, produced and tested as in Example 1, proved that the encapsulated r/P powder was uniformly and homogeneously distributed in all their mass. Said test pieces resulted to be self-extinguishing.

From the foregoing description and examples there are apparent the advantages of the present invention, which may be summarized as follows:

it is possible to obtain, without technical and hygienic drawbacks, concentrates with a high red phosphorus content in polymeric substances. Said concentrates can be handled, stored, transported and dosed with a high degree of easiness and safety;

it is possible to obtain, by using said concentrates as red phosphorus vehicles, self-extinguishing thermoplastic materials (transformable into shaped articles by means of hot-molding processes, in particular extrusion and injection molding) wherein red phosphorus is finely particulated and very homogeneously distributed, what results in an optimization of the flame-retarding action of said red phosphorus.

The process according to the present invention, as is described hereinbefore and hereinafter claimed, may be modified with technically equivalent elements, provided they fall within the scope of the invention. In particular, for example, the encapsulated r/P powder can be added to the "mother polymeric substance" after (instead of before) the latter has been brought to the plastic state.

We claim:

1. A process for making self-extinguishing thermoplastic materials based on synthetic polymeric substances by incorporation of red phosphorus into said materials, which process comprises the steps of:
    (a) preparing an in water diluted melamine precondensate by first reacting 21.62 to 25.27% melamine, 30.85 to 36.04% formaldehyde, 25.57 to 29.87% triethanolamine and 8.82 to 21.96% of monohydroxyl alcohol having less than 5 carbon atoms, and then cationizing and diluting with a mineral acid and water until a pH of 7–7.6 and a viscosity of 40–50 centipoise are reached;
    (b) dispersing a micronized red phosphorus powder in the cationized solution of melamine precondensate obtained in step (a), then heating under stirring at about 100° C. to precipitate said precondensate in the form of a partially cross-linked resin around the red phosphorus particles and finally drying and completing the resin's cross-linking at approx. 100° C. in an inert atmosphere;
    (c) forming, by mixing and extruding, a concentrate comprising 30 to 70% by weight of a mother polymeric substance and 70 to 30% by weight of the encapsulated red phosphorus obtained in step (b), said mother polymeric substance being a synthetic thermoplastic polymer selected from the group consisting of polyamides, polyolefins, copolymers from acrylonitrile-butadiene-styrene polystyrenes, vinylchloride homo- and co-polymers, vinylacetate copolymers, polycarbonates and linear polyesters; and
    (d) incorporating said concentrate into a thermoplastic material to be made self-extinguishing, consisting of at least 50% by weight of any synthetic thermoplastic polymer defined in step (c), the amount of the abovesaid concentrate being quantitatively proportioned in such manner, that the final self-extinguishing thermoplastic material contains 1 to 15% by weight of said encapsulated red phosphorus powder.

2. A process according to claim 1, in which said concentrate and said thermoplastic material to be made self-extinguishing comprise further at least a coadjuvant substance selected from the group consisting of reinforcing filler, inert fillers, pigments, dyestuffs, stabilizers, lubricants and other known conventional additives.

3. A process according to claim 1, in which the incorporation of said concentrate into said thermoplastic material is accomplished by mixing them in the plastic state during any of the production steps of said final self-extinguishing thermoplastic material.

4. Concentrates comprising 30–70% by weight of a synthetic thermoplastic polymer and 70–30% by weight of encapsulated red phosphorus powder, obtained by the process according to claim 1.

5. Concentrates according to claim 4, which further comprise at least a coadjuvant substance selected from dyestuffs, stabilizers, lubricants and other known conventional additives 6. Synthetic thermoplastic materials processable into shaped articles by means of hot-molding processes, made self-extinguishing by the process according to claim 1.

* * * * *